United States Patent [19]
Lesthievent

[11] Patent Number: 5,844,936
[45] Date of Patent: Dec. 1, 1998

[54] METHOD AND DEVICE FOR ELIMINATING INTERFERENCE SIGNALS IN A DIRECT SEQUENCE SPREAD SPECTRUM LINK

[75] Inventor: Guy Lesthievent, Portet, France

[73] Assignee: Centre National d'Etudes Spatiales, Paris Cedex, France

[21] Appl. No.: 610,149

[22] Filed: Feb. 29, 1996

[30] Foreign Application Priority Data

Dec. 22, 1995 [FR] France ................................. 95 15391

[51] Int. Cl.$^6$ ........................................... H04B 1/707
[52] U.S. Cl. ........................ 375/206; 375/317; 375/346
[58] Field of Search ............................... 375/346, 350, 375/317, 206, 345, 367; 455/296, 308; 358/463, 464; 370/335, 342, 441

[56] References Cited

U.S. PATENT DOCUMENTS 4,462,048  7/1984  Ross ........................................ 358/336
5,271,038  12/1993  Cai ........................................ 375/349

*Primary Examiner*—Don N. Vo
*Attorney, Agent, or Firm*—Oblon, Spivak, McClelland, Maier & Neustadt, P.C.

[57] ABSTRACT

A method for eliminating interference signals in a direct sequence spread spectrum link involves frequency detection of interference signals by comparison of the spectrum of the composite input signal with a threshold and filtering of the composite input signal by a finite impulse response filter using rapid convolution. The detection of threshold is automatically controlled by using an estimate of the spectral input density after eliminating large interference signals.

17 Claims, 6 Drawing Sheets

METHOD AND DEVICE FOR ELIMINATING INTERFERENCE SIGNALS IN A DIRECT SEQUENCE SPREAD SPECTRUM LINK

BACKGROUND OF THE INVENTION

1. Field of the Invention

The present invention relates to a method for eliminating interference signals in a direct sequence spread spectrum link and to a device for eliminating interference signals permitting the quasi-optimum performance of the method.

A particular application of the invention is in the STARSYS system, which uses a constellation of small satellites on low circular orbits for performing bidirectional short messaging and locating services between mobile terminals and a user base via one or more ground stations. These ground stations define service areas by need for a mutual visibility between the terminal, satellite and ground station, but permit a global world coverage.

For this purpose, the system uses spread spectrum links in the direction mobile terminals to ground stations, but also narrow band channels between ground stations and terminals. The use of the direct sequence spread spectrum enables the system to operate with about a dozen accessors (terminals) in simultaneous form in the same band, whilst having low transmission powers.

The connection between the ground stations and the terminals is of a more conventional nature. Location takes place by the simultaneous processing of Doppler/Fizeau shift informations and distance measurement.

2. Discussion of Background

Although direct sequence spread spectrum links are relatively robust against narrow band parasitic signals by their very principle, their performance characteristics are detrimentally affected by a large number of high power parasitic, unwanted or interference signals, as described in document [1] at the end of the description.

This deterioration leads to an increase in the bit error rate. It is therefore necessary to use in multiple access spread spectrum satellite links (MASS) adaptive on-board systems for rejecting narrow band interference signals.

The field of the invention is that of the adaptive filtering of interference signals in the frequency domain (Frequency Domain Adaptive Filter or FDAF), such as is described in documents [2], [3], [5] and [6]. Interference signal adaptive filtering in the frequency domain is broken down into two independent stages, which can optionally be combined in order to simplify the material implantation of the algorithm.

The first stage consists of a frequency detection of the interference signals by comparison of the spectrum of the composite input signal (spread spectrum and noise signals and interference signals) with a given threshold. This is followed by the formation of the impulse response of a finite impulse response filter (RIF) constituted by notch filters at frequencies where interference signals have been identified. Finite impulse response filtering does not deform the phase information carrying the useful modulation. This operation requires a direct discrete Fourier transform (DFT) for passing into the frequency domain.

The second stage consists of filtering the composite input filter by the previously synthesized FIR. This operation takes place by a rapid convolution and requires a direct discrete Fourier transform and an inverse discrete Fourier transform.

This procedure makes it possible to reject all narrow band interference signals with a power higher than a given power. The distortion of the useful signal is only dependent on the relationship between the filtered band and the useful band of the spread signal. This method has the advantage of only being sensitive to the total band occupied by the interference signals and not to their modulation. The blockwise treatment and the fast Fourier transform algorithm, as described in document [4] for direct and inverse discrete Fourier transforms, permit an effective implementation of relatively reduced complexity of adaptive FIR's with a large number of coefficients.

However there is an optimum threshold beyond which the adaptive filtering of low power interference signals deteriorates the link more than the non-rejection and spread of the energy of the interference signals by the spread spectrum receiver. The filtered useful signal is too distorted as regards level and pulse shape to be conveniently despread. This optimum threshold can be measured relative to the spectral density of the spread spectrum signals and white noise.

The object of the invention is to obviate this disadvantage, in order to permit a better elimination of interference signals in a direct sequence spread spectrum link.

SUMMARY OF THE INVENTION

The present invention relates to a method for eliminating interference signals in a direct sequence spread spectrum link having the following stages:

frequency detection of interference signals by comparison of the composite input signal spectrum with a threshold, filtering the composite input signal by a finite impulse response filter by rapid convolution, characterized simultaneously by:

a slaving of the detection threshold using an estimate of the spectral input density after eliminating large interference signals and by checking a single variable $\Delta$ around its optimum $\Delta$Opt, maintaining a constant output power by compensating the influence of the detection threshold thereon, a quasi "whitening" of the retransmitted spectrum.

Thus, the originality of the invention is in the characteristics of the method of adaptive filtering of the interference signals in the frequency domain based on the automatic control of the detection threshold once the large interference signals have been eliminated. This automatic control, based on an estimate of the spectral input density makes it possible, in closed or open loop, to be close to the performance optimum and check the total output power, as well as the retransmitted flow.

The interference signals can be narrow band modulated (with respect to the band occupied by the useful signals in direct sequence spread spectrum) or not modulated (pure carrier).

Advantageously, in closed loop, a discrete slaving serves to maintain the detection threshold in a certain range around an optimum threshold.

The optimum threshold (Seuil) is calculated with the aid of an estimator $\hat{S}_{tot}$, whilst knowing $\Delta$Opt:

$$\hat{SeuilOpt} = \hat{S}_{tot} + \Delta Opt.$$

When the threshold is within the interval or range [ŜeuilOpt−A, ŜeuilOpt+A], the detection instruction Seuil does not change, but otherwise Seuil=Seuil±B, depending on whether Seuil is above SeuilOpt+A or below SeuilOpt−A.

In the method of the invention, there are advantageously the following stages:

estimate of the optimum threshold such as:

$$\hat{\bar{S}}^i_{tot} = \frac{1}{M} \sum_{k=0}^{M-1} GB^i(k) \cdot |S_E^i(k)|$$

averaging on P consecutive blocks so that:

$$\hat{\bar{S}}_{tot} = \frac{1}{p} \sum_{p=0}^{p-1} \hat{\bar{S}}_{tot}$$

estimate of the optimum threshold so that:

Seuil Opt= $\hat{\bar{S}}_{tot}$+ΔOpt modification of the threshold instruction so that:

if |Seuil − Šeuil Opt| > A then: $\begin{cases} \text{Seuil} = \text{Seuil} - B \text{ if (Seuil} - \hat{\text{SeuilOpt}}) > 0 \\ \text{Seuil} = \text{Seuil} + B \text{ if (Seuil} - \hat{\text{SeuilOpt}}) < 0 \end{cases}$ in parallel, development of a reliable, simplified, analytical model permitting, by averaging the knowledge of the satellite position and the traffic in the system, the obtaining of another optimized threshold, which can be remotely controlled as the open loop instruction.

Advantageously, in open loop, for carrying out a filtering of an input signal by an adaptive notch filter and by a band pass filter, a convolution of the signals is carried out. Use is made of a direct fast Fourier transform and an inverse fast Fourier transform. It is possible to use the same direct fast Fourier transform for filtering and detection.

In the method of the invention there are advantageously the following stages:

overlap by a factor ½ of the blocks of size M:

$$\forall m \in [0, M-1] \; s_E^i(m) = s_E\left(i \cdot \frac{M}{2} + m\right)$$

truncation and passage into the frequency domain:

$$S_E^i(k) = TFD[s_E^i(m) \cdot w_M(m)] = \frac{1}{M} \sum_{m=0}^{M-1} s_E\left(i \cdot \frac{M}{2} + m\right) \cdot w_M(m) \cdot e^{-j2\pi \frac{k}{M} m}$$

multiplication by the band pass and adaptive filtering jig:

$$s_s^i(k) = S_E^i(k) \cdot GB^i(k)$$

passage into the time domain:

$$s_s^i(m) - \text{inverse } DFT[S_s^i(k)] = \sum_{k=0}^{M-1} (S_E^i(k) \cdot GB^i(k)) \cdot e^{j2\pi \frac{k}{M} m} =$$

$$\sum_{k=0}^{M-1} \left( \frac{1}{M} \sum_{m=0}^{M-1} s_E\left(i \cdot \frac{M}{2} + m\right) \cdot w_m(m) \cdot e^{-j2\pi \frac{k}{M} m} \right) \cdot GB^i(k) \cdot e^{j2\pi \frac{k}{M} m}$$

rejection of the two ends of size M/4 of the blocks and reconstitution of the output signal:

$$\forall n \left[\frac{M}{4}, \infty\right] \; i = int\left(\frac{2n}{M} + \frac{1}{2}\right) - 1 \; s_s(n) = s_s^i\left(n - i\frac{M}{2}\right) G\left[\frac{M}{4}, \frac{3M}{4} - 1\right]$$

In the open loop mode, when the method of the invention is used in a satellite location system, the threshold instruction is loaded by remote control from the ground and is used for controlling a variable gain at the output of FDAF. The total output power of FDAF is directly proportional to the threshold (in the vicinity of the optimum), the FDAF associated with a slaved variable gain making it possible to use in optimum manner the non-linear amplification on board the satellite and control the total power transmitted at the output of the satellite.

The invention also relates to a device for eliminating the interference signal in a direct sequence spread spectrum link and which advantageously comprises:

a serial-parallel conversion module for blocks of size M, in which there is an overlapping of the blocks by M/2 and which receives a complex input signal $s_E(n)$, a second discrete Fourier transformation module with the aid of a complex, direct fast Fourier transform, on blocks of size M, to pass in this way into the frequency domain, which receives the phase output (Phs) and amplitude output (Mag) of the first module, a third inverse Fourier transformation module with the aid of an inverse fast Fourier transform, on blocks of size M, receiving the amplitude and phase outputs of the preceding module, a fourth parallel-serial conversion module for blocks of size M, with rejection of M/2 samples of the ends of the block obtained, which supplies the complex output signal $s_S(n)$, a module for generating a time truncation window, e.g. having a trapezoidal shape, supplied to an input of a first vector multiplier placed between the amplitude output of the first module and the amplitude input of the second module, a comparator of the module of each discrete spectral smaple $s_E(k)$ for $0 \leq k \leq M-1$ with a threshold for producing a jig for the location of interference signals Gb(k), which receives the amplitude signal at the output of the second module, as well as a threshold signal, a band pass FIR filter, whose output is supplied to a second vector multiplier, which also receives the comparator output and whose output is supplied to a third vector multiplier located between the amplitude output of the second module and the amplitude input of the third module, an estimator of the optimum threshold such that:

$$\hat{\bar{S}}^i_{tot} = \frac{1}{M} \sum_{k=0}^{M-1} GB^i(k) \cdot |S_E^i(k)|$$

an averaging module on P consecutive blocks such that:

$$\hat{\bar{S}}_{tot} = \frac{1}{p} \sum_{p=0}^{p-1} \hat{S}^p_{tot}$$

an estimator of the optimum threshold such that:

Šeuil Opt= $\hat{\bar{S}}_{tot}$+ΔOpt a module for modifying the threshold instruction such that:

if $|\text{Seuil} - \hat{\text{Seuil}} \text{ Opt}| > A$ then $\begin{cases} \text{Seuil} = \text{Seuil} - B \text{ if}(\text{Seuil} - \hat{\text{Seuil}}\text{Opt}) > 0 \\ \text{Seuil} = \text{Seuil} + B \text{ if}(\text{Seuil} - \hat{\text{Seuil}}\text{Opt}) < 0 \end{cases}$ a first and a second switch making it possible to operate in the closed loop mode (mode 0) or open loop mode (mode 1), the first switch supplying the threshold signal to the comparator and the second being connected to a scalar multiplier placed between the multiplier output and the amplitude input of the third module.

DETAILED DESCRIPTION OF EMBODIMENTS

Hereinafter an exemplified description is given of the method and device according to the invention used in the STARSYS system.

The method of adaptive filtering of interference signals in the frequency domain (FDAF), as described in documents [2] and [3], consists of carrying out the two following consecutive operations:

frequency detection of interference signals and formation of an adaptive FIR filter, finite impulse response filtering (FIR) of the composite signal (spread spectrum signals, noise and interference signals) using a fast convolution procedure, as described in document [5].

Details of these two stages will be given hereinafter.

The time domain signals are given in small letters, whereas the capital letters are used for frequency domain signals. The letter n is used in the time plane and signifies n=n.Te. The letter k is used in the discretized frequency plane on M samples and means k=k/M.Fe. Working takes place on complex signals.

Figure 1:
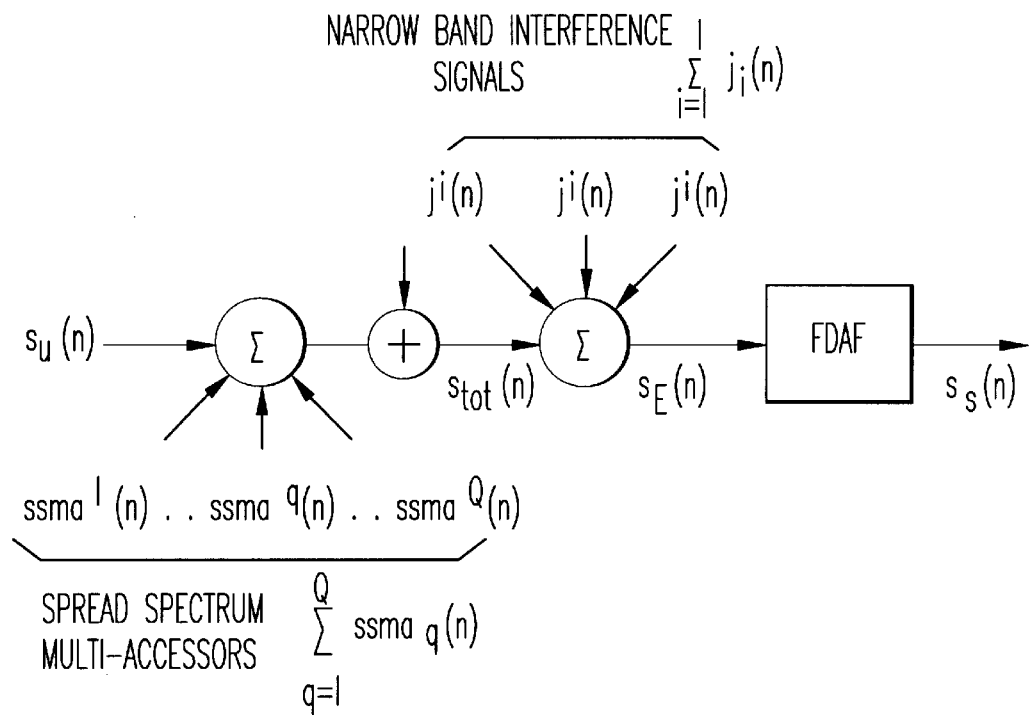
FIG. 1 illustrates the composition of the complex input time signal.

At the input of the device for performing the method according to the invention is provided a complex time signal $s_E(n)=s_E(n.Te)$, correctly sampled at the frequency Fe=1/Te. As illustrated in FIG. 1, this signal is constituted by the following signals:

$s_u(n)$    spread spectrum useful signal on a band $B = \alpha \cdot Fe$ with $0 < \alpha < 1$, $\sum_{q=1}^{Q} ssma_q(n)$    Q spread spectrum users(multi-accessors)on a band B, $n_b(n)$    Gaussian white noise, $\sum_{i=1}^{I} j_i(n)$    I narrow band interference signals in the band B.

By separating the narrow and broad band signals:

$s_E(n) = s_{tot}(n) - \sum_{i=1}^{I} j_i(n)$ time signal at the input of the device according to the invention(FDAF)with:

$$S_{tot}(n) = \left( s_u(n) - \sum_{q=1}^{Q} ssma_q(n) + n_b(n) \right)$$

broad band signals (white noise and spread signals), i.e. $s_s(n)$ the discrete time signal at the output of the FDAF device.

For carrying out the frequency detection of the interference signals in the discrete, complex, composite, input signal $s_E(n)$, firstly a direct Fourier transform (DFT) is performed with the aid of a fast Fourier transform (FFT) as described in document [4] on a block of size M in order to pass into the frequency domain:

$\forall_k \in [0, M-1],$ $$S_E(k) = TFD[s_E(n) \cdot w(n)] = \frac{1}{M} \sum_{n=0}^{M-1} [s_E(n) \cdot w(n)] \cdot e^{-j2\pi \frac{k}{M} n}$$

with $\begin{cases} w(n) \text{time truncation window} \\ S_u(k) = TFD[s_u(n) \cdot w(n)] \quad \text{complex spectrum of the spread useful signal} \\ SSMAp(k) = TFD[ssmap(n) \cdot w(n)] \quad \text{complex spectrum of a spread spectrum user} \\ N_b(k) = TFD[n_b(n) \cdot w(n)] \quad \text{complex spectrum of white noise} \\ J_i(k) = TFD[j_i(n) \cdot w(n)] \quad \text{complex spectrum of a narrow band interference signal.} \end{cases}$ On separating the narrow and broad band signals:

$\forall k \in [0, M-1], \quad S_E(k) = S_{tot}(k) + \sum_{i=1}^{I} j_i(k)$ with:

$$S_{tot}(k) = \left( S_u(k) + \sum_{q=1}^{Q} SSMA_q(k) + N_b(k) \right)$$

complex spectrum of broad band signals.

Figure 2:
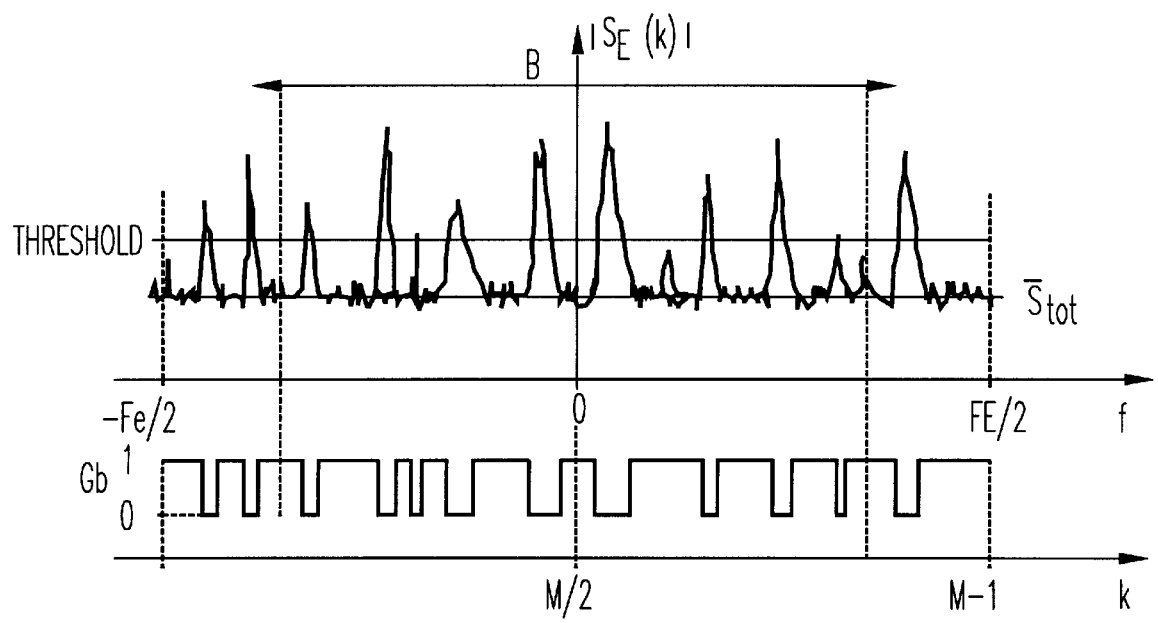
FIG. 2 illustrates an interference signal location jig.

Comparison then takes place between the module of each discrete spectral sample $|S_E(k)|$ $0 \leq k \leq M-1$, with a constant threshold (Seuil) on [0, Fe]. Thus, we obtain a jig for the location of interference signals Gb(k) equal to zero if the module of the spectrum is above the threshold and is otherwise one, as illustrated in FIG. 2.

$$\forall 1 \in [0, M-1] Gb(1) = \begin{cases} 0 \text{ if } |S_E(1)| \geq \text{Seuil} \\ 1 \text{ if } |S_E(1)| < \text{Seuil} \end{cases}$$

The choice of M is a compromise between the frequency analysis fineness (elementary resolution Fe/M) and the time duration of said analysis (M/Fe) in order to obtain a quasi-stationary nature of the narrow band interference signals (minimum spectral occupation). The optimum obtained after testing is M=1024 for a band B=900 kHz to 1 MHz and the sampling frequency Fe from 1.2 to 1.5 MHz.

This provides the impulse response of a FIR filter constituted by notch filters at discrete frequencies, where the interference signals have been identified.

The detection threshold must be above the spectrum formed by the spread spectrum signals and noise: $\forall k \in [0, M-1]$ Seuil$>S_{tot}(k)$. Thus, otherwise, detection takes place of a very large number of spectral samples above the threshold. As the filtered band is then relatively high compared with the useful band B, the deteriorations as regards power and shape of the pulse of the useful signal no longer permit a correct despreading of the useful signal.

Instead of using a constant threshold on the frequency band, consideration can be given to using a threshold which would have a spectral shape similar to the spectrum of the modulation of the useful signal for weighting the filtering as a function of the information and consequently the broad band useful signal deterioration would be reduced.

The band occupied by the spread spectrum signals is B=$\alpha$.Fe with 0<$\alpha$<1, i.e. $\alpha$.M spectral samples (with $\alpha$.M even integer). Thus, only the central $\alpha$.M samples of Gb(k) are retained.

Figure 3:
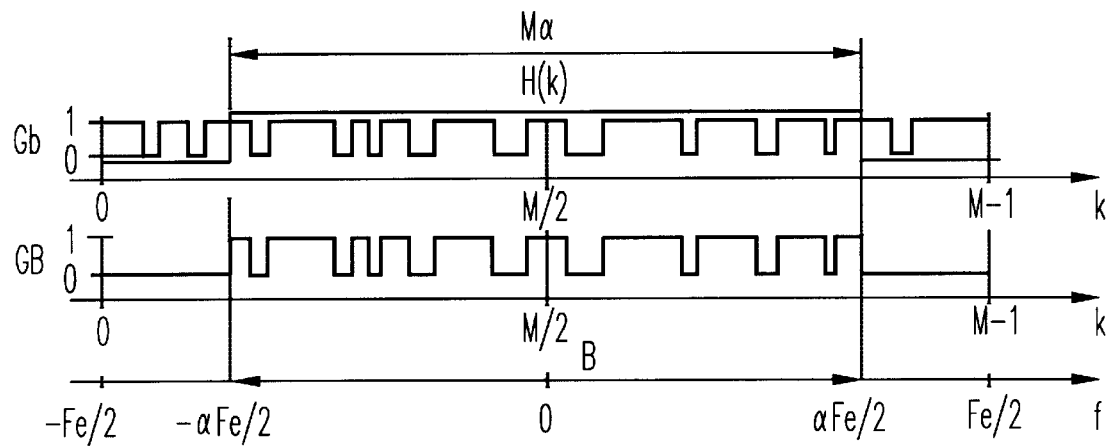
FIG. 3 illustrates a band pass filtering.

The simplest band pass filter consists of applying a rectangular window $\Pi_{F_e}$(f) in the frequency domain centered on f=0 and of width Fe, as illustrated in FIG. 3. In this case the new jig is written:

$$\forall 1 \in [0, M-1] GB(1) = \begin{cases} Gb(1) \dfrac{M(1-\alpha)}{2} \leq 1 \leq \dfrac{M(1+\alpha)}{2} \\ 0 \text{ otherwise} \end{cases}$$

Figure 4:
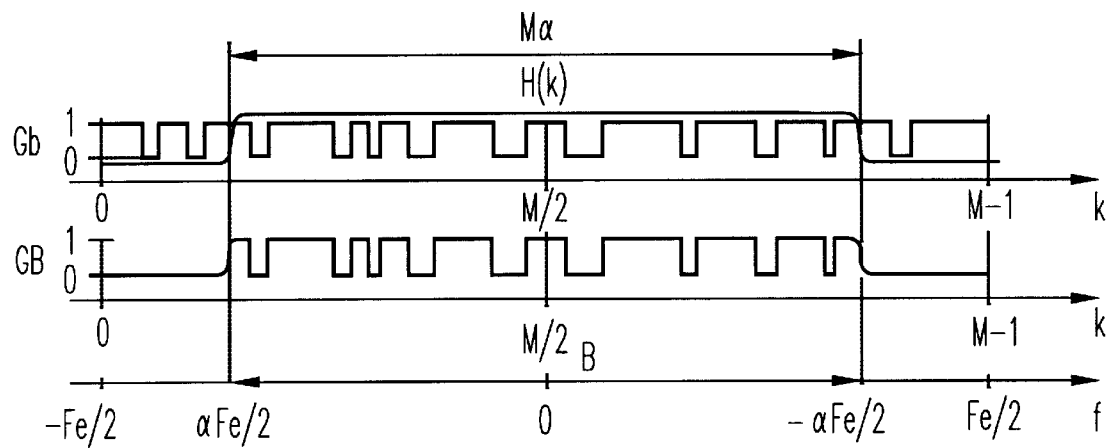
FIG. 4 illustrates a band pass filtering and adaptive filtering jig.

In order to limit oscillations in the time domain due to the sudden truncation of the frequency jig (Gibbs phenomenon), application takes place of a frequency truncation window H(f) which is gentler than the rectangular window. Calculation takes place of the spectral instruction H(f) on the basis of a FIR filter of sample length M, followed by tabulation thereof. All that remains is to form the product of Gb(k) by H(k) in order to obtain the band pass filtering and adaptive filtering jig GB(k), as illustrated in FIG. 4.

Figure 5:
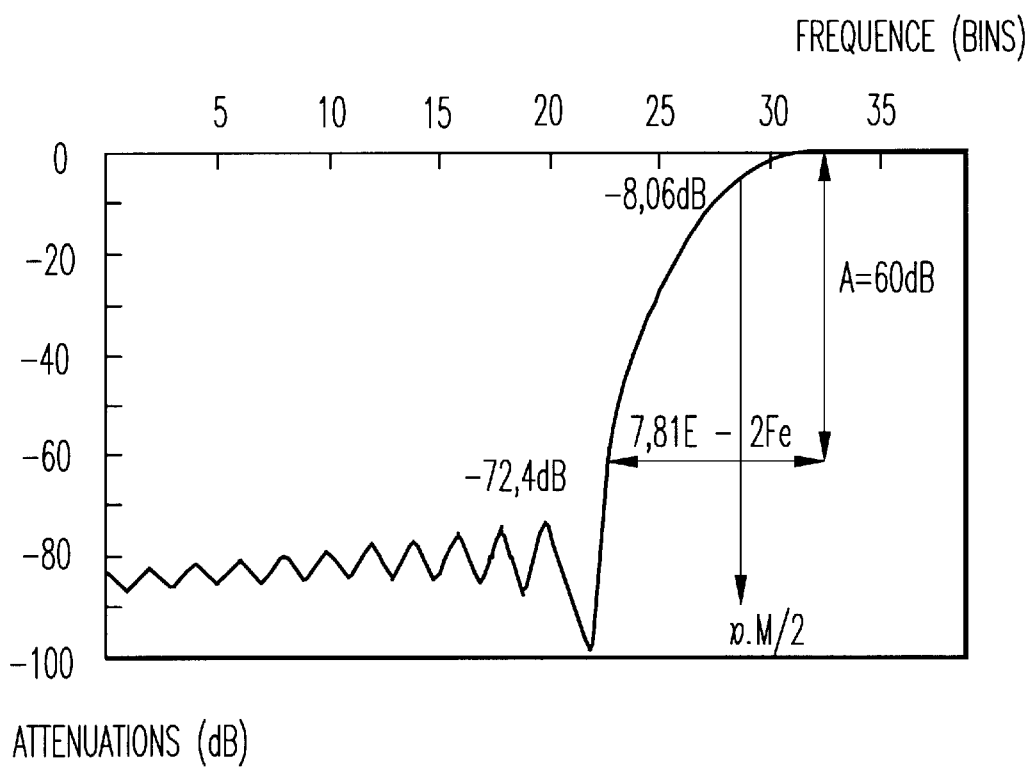
FIG. 5 illustrates the rejection obtained by the band pass filter.

Convolution takes place in the frequency domain of the rectangular window $\pi_{\alpha F_e}$(f) by the Fourier transform of one Gauss(x) of parameter $\gamma$=3. This band pass filter makes it possible to obtain a rejection of –60 dB at 0.078 Fe of the cutoff frequency at $\alpha$Fe/2 (or $\alpha$.M/2 in samples), as illustrated in FIG. 5.

$$H(f) = \Pi_{\alpha Fe}(f) * TFD[\text{Gauss}(x)] = TFD\{TFI[\Pi_{\alpha Fe}(f)] \cdot \text{Gauss}(x)\}$$

$$\Pi_{\alpha Fe}(f) = \begin{cases} 1 \text{ for } -\dfrac{\alpha \cdot Fe}{2} \leq t < \dfrac{\alpha \cdot Fe}{2} \\ 0 \text{ otherwise} \end{cases}$$

$$\text{Gauss}(x) = \begin{cases} \exp\left(-\dfrac{1}{2}(\gamma \cdot x)^2\right) - 1 \leq x < 1 \\ 0 \text{ otherwise} \end{cases}$$

In order to improve detection, it is desirable to use a time truncation window w(t) of size T=MTe. Thus, the use of a rectangular natural window $\pi_T$(f) ensures the best frequency resolution, but the high side lobes of the spectrum $\pi$(f) are liable to trigger false detections on neighbouring spectral samples of the main peak if the detection threshold is too low.

Figure 6:
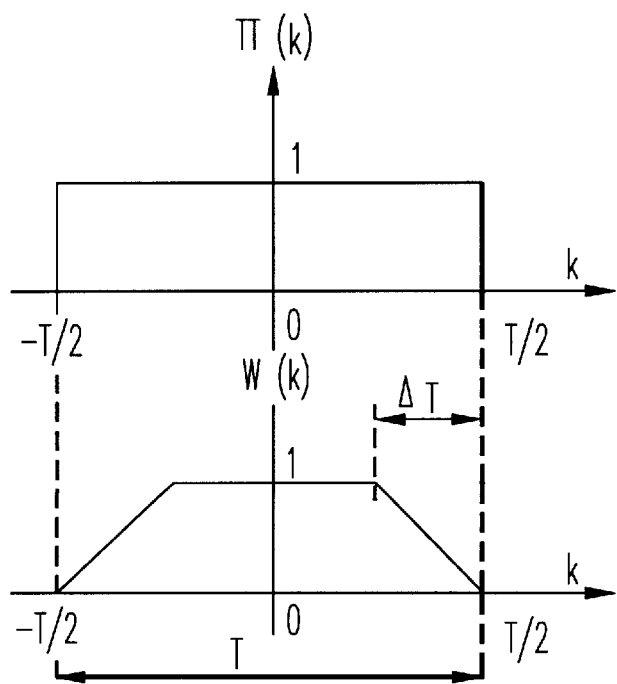
FIG. 6 illustrates a time truncation window used.

In addition, filtering by convolution requires a direct discrete Fourier transform and an inverse discrete Fourier transform. In order to simplify the material implantation of the algorithm and significantly reduce calculation costs, use is made of the same direct discrete Fourier transform for detection and convolution. Thus, the truncation window w(t) must represent a compromise between the improvement to the detection and the deterioration of the filtering. The window retained is a trapezoidal window, whose relative rise and fall times ($\Delta T/T$) are ¼, as illustrated in FIG. 6:

$$\Pi_T(t) = \begin{cases} 1 \text{ for } -\dfrac{T}{2} \leq t < \dfrac{T}{2} \quad \dfrac{TF}{\longrightarrow} \quad \Pi(f) = \dfrac{\sin(\pi f T)}{(\pi f T)} \\ 0 \text{ otherwise} \end{cases}$$

$$w_T(t) =$$

$$-|t| \text{ for } \dfrac{T - \Delta T}{2} \leq |t| < \dfrac{T}{2}$$

$$1 \text{ for } 0 \leq |t| < \dfrac{T - \Delta T}{2} \quad \dfrac{TF}{\longrightarrow} \quad w(f) =$$

$$\left(1 - \dfrac{\Delta T}{T}\right) \dfrac{\sin\left(\pi f T \dfrac{\Delta T}{T}\right)}{\left(\pi f T \dfrac{\Delta T}{T}\right)} \cdot \dfrac{\sin\left(\pi f T 1 - \dfrac{\Delta T}{T}\right)}{\left(\pi f T \left(1 - \dfrac{\Delta T}{T}\right)\right)}$$

$$0 \text{ otherwise}$$

Figure 7:
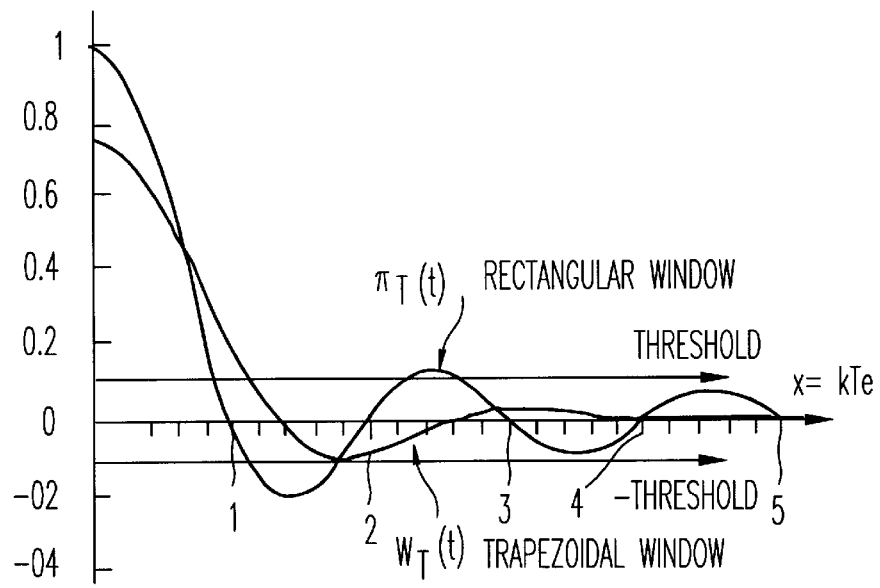
FIG. 7 illustrates the Fourier transform of rectangular and trapezoidal windows.

FIG. 7 illustrates the Fourier transform of rectangular and trapezoidal windows.

For a low threshold, detection takes place of more bins (elementary frequency steps in fast Fourier transform) with the trapezoidal window than with the rectangular window around the centre frequency of the interference signal. The filtered band for an identical interference signal is larger with the trapezoidal window, but the risk of detecting bins on side lobes is lower.

The more the detection threshold is lowered the more the signal is deteriorated. Thus, the lower it is, the greater the band reduced by filtering and the greater the deterioration of the pulse shape and level of the useful signal. Thus, there is a reduction in the power of the interference signals, but in parallel there is a deterioration in the pulse shape and level of the useful signal.

The reduction of the power of the interference signals and the deterioration of the useful signal evolve in opposite directions, so that there is an optimum detection threshold. The performance characteristics are only slightly deteriorated close to the optimum, i.e. A is the tolerance limit, so that for |Seuil-Seuil Opt|$\leq$A, the performance characteristics remain acceptable.

The lower threshold limit is represented by the mean value of $S_{tot}(k.Fe)$ on the $\alpha$M central spectral samples representing the useful band B:

$$\overline{S}_{tot} = \frac{1}{\alpha M} \sum_{k=-\alpha M/2}^{\alpha M/2-1} S_{tot}(k).$$

Beyond $\overline{S}_{tot}$, it can be considered that detection takes place of all the bins (elementary frequency steps in FFT) and elimination takes place of the complete signal $s_E(n)$ present in the band (useful signal, multi-accessors, noise and interference signals).

Thus, referencing takes place of the optimum threshold relative to the mean input spectrum, less the contribution of the narrow band interference signals, i.e. $\overline{S}_{tot}$:

$$\overline{S}_{tot} = \overline{\left( S_u(k) + \sum_{q=1}^{Q} SSMA_q(k) + N_b(k) \right)}$$

total mean spectrum of the broad band, complex signals: ΔOpt=difference between the optimum threshold and the total mean spectrum $\overline{S}_{tot}$, i.e. SeuilOpt=$\overline{S}_{tot}$+ΔOpt is the threshold optimizing the link in bit error rate (BER).

The automatic control of the threshold can function in two different ways, namely in closed loop and in open loop.

Figure 8:
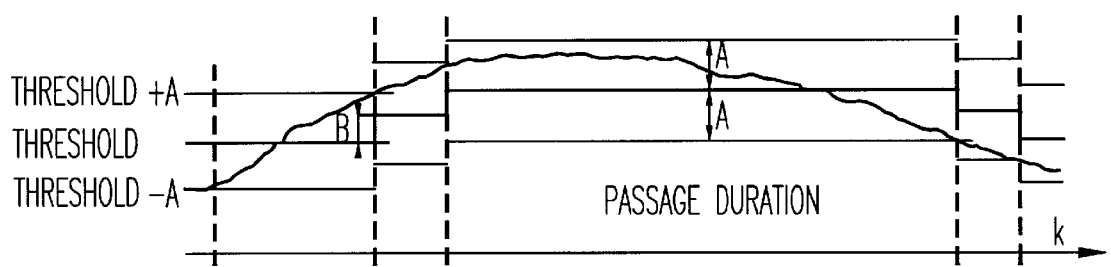
FIG. 8 illustrates the closed loop operation of the method according to the invention.

In the closed loop operating mode illustrated in FIG. 8, discrete automatic control maintains the detection threshold in a certain range around the optimum threshold.

With the aid of an estimator $\hat{\overline{S}}_{tot}$ and knowing the difference ΔOpt, the estimated optimum threshold is calculated:

$$\hat{Seuil}Opt = \hat{\overline{S}}_{tot} + \Delta Opt.$$

When the threshold is in the range [ŜeuilOpt−A, ŜeuilOpt+A], the detection instruction Seuil does not change, otherwise Seuil=Seuil±B depending on whether Seuil exceeds SeuilOpt+A or is below SeuilOpt−A (FIG. 8). This slaving makes it possible to compensate slow variations of $\hat{\overline{S}}_{tot}$ and A is chosen in such a way that on the range [ŜeuilOpt−A, ŜeuilOpt+A) the deterioration of the link remains acceptable.

The estimated optimum threshold ŜeuilOpt and the effective detection threshold Seuil constitute two important telemetries which are representative of the operation of the method according to the invention.

On the basis of the jig GB(k) defined on [0,2N] and the signal $S_E(k)$, construction takes place of an estimator $\overline{S}_{tot}^i$ of $\overline{S}_{tot}^i$ mean total spectrum of the spread spectrum signals and noise for the nth block of size M.

The product of the filtering jig GB(k) and the module of the discrete spectrum of the input signal $|S_E(k)|$ effects a filtering operation in the frequency domain, which eliminates the narrow band interference signals. Ideally, all that remains is the contribution due to the spread spectrum signals and the noise $S_{tot}(k)$.

The estimator of the spectral density of the broad band signals is such that:

$$\forall K \in [0,M-1] \hat{S}_{tot}(k) = GB(k) \cdot |S_E(k)|.$$

The mean is then formed on M spectral samples of the fast Fourier transform.

The estimator of the mean spectral density of the broad band signals is such that:

$$\hat{\overline{S}}_{tot}^i = \frac{1}{M} \sum_{k=0}^{M-1} GB^i(k) \cdot |S_E^i(k)|.$$

This is followed by the formation of the mean on P consecutive blocks of $S_{tot}^i$, which is equivalent to a first order filtering with a time constant T0:T0=P.(M.Te) seconds in the case of the fast Fourier transform without block overlap and T0=(P+1)/2. (M.Te) if fast Fourier transforms are formed with half-block overlap.

The estimator of the optimum threshold is such that:

$$\hat{\overline{S}}_{tot} = \frac{1}{P} \sum_{p=0}^{P-1} \hat{\overline{S}}_{tot}^p$$

Knowing the difference ΔOpt, from it is deduced an estimate of the optimum threshold:

ŜeuilOpt= $\hat{\overline{S}}_{tot}$+ΔOpt

The following modification of the threshold instruction is obtained:

if |Seuil − ŜeuilOpt| > A then: $\begin{cases} \text{Seuil} = \text{Seuil} - B \text{ if(Seuil} - \hat{\text{Seuil}}\text{Opt)} > 0 \\ \text{Seuil} = \text{Seuil} + B \text{ if Seuil} - \hat{\text{Seuil}}\text{Opt)} < 0 \end{cases}$ In the open loop operating mode, the detection threshold Seuil is directly downloaded from the ground. It is no longer modified on board, even if it passes out of the range [ŜeuilOpt−A, ŜeuilOpt+A]. The use of the telemetry of the estimated optimum threshold ŜeuilOpt can be used for modifying the instruction from the ground.

The total output power of the device according to the invention is directly proportional to the detection threshold close to the optimum threshold. The lower the threshold, the lower the total power at the output of the device.

This operating mode of the device, combined with a threshold-automatic controlled, variable numerical gain at the output of the device makes it possible to optimize the non-linear amplification on board the satellite by imposing a fixed back-off at the input thereof.

The slaving of the threshold variable gain is such that:
Pout$_{13}$fdaf=K.Seuil: total power at the output of the device,
Pout$_{13}$gain: total power at the output of the variable gain,
Pout: total power at the output of the non-linear amplifier,
G: variable gain
Gsat: fixed gain of satellite to the output of the non-linear amplifier.

At the output of variable gain:

$$Pout\_gain = G.\, Pout\_fdaf$$
$$= G.\, K.\, Seuil$$

At the output of the non-linear amplifier:

$$Pout = Gsat.\, Pout\_gain$$
$$= Gsat.\, G.\, K.\, Seuil$$

$$\text{thus } G = G(Pout, Seuil) = \frac{Pout}{Gsat.\, K.\, Seuil}$$

With this Seuil-variable gain slaving, to obtain the given power at the output of the satellite (e.g. respecting radio-communications standards), it is known which threshold must be downloaded.

Moreover, the application of a constant threshold to the useful band has the effect of smoothing the spectral power density by eliminating peaks corresponding to interference signals. The result at the output is a total, complex, Gaussian signal $s_s(n)$ corresponding to a whitening of the spectrum in the useful band. This whitening makes it possible to limit to the maximum the presence of interference signals, even considered in a narrow band, on retransmission, without excessively deteriorating the performance characteristics of the reception station (optimum with a Gaussian, white, additive noise at the input and decorrelated with the useful signals).

Figure 9:
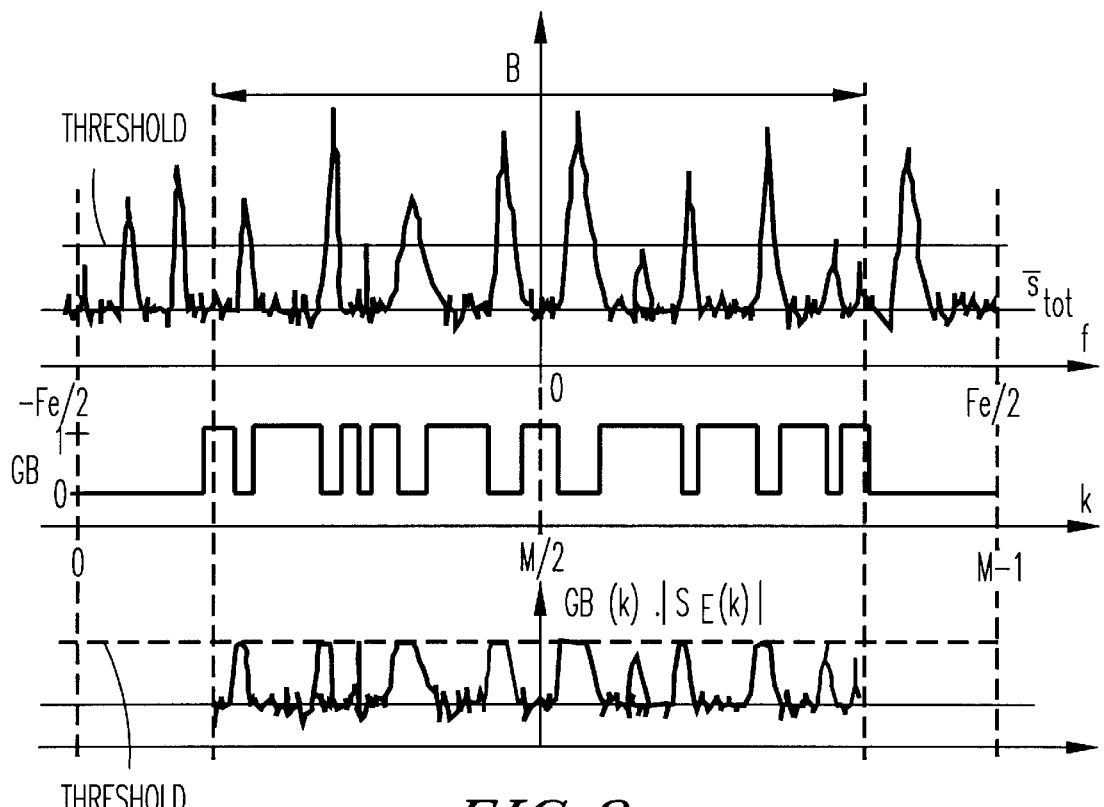
FIG. 9 illustrates convolution filtering.

The filtering operation of the input signal $s_E(n.Te)$ by the adaptive notch filter and the band pass filter consists of the convolution of $S_E(n.Te)$ by $gb(n.Te)=$ inverse DFT [GB (k.Fe)], i.e. in the frequency domain the product of $S_E(k.Fe)$ =DFT [$s_E(n.Te)$] by GB(k.Fe), as illustrated in FIG. 9:

$$s_s(n \cdot Te) = s_E(n \cdot Te) * \text{inverse } DFT[GB(k \cdot Fe)]$$
$$= \text{inverse } DFT[TFD[s_E(n \cdot Te)] \cdot GB(k \cdot Fe)]$$

This operation requires a direct fast Fourier transform and an inverse fast Fourier transform. Use is made of the same direct fast Fourier transform for filtering and detection in order to economize on calculations. Thus, the same time truncation window is used for detection and filtering.

Figure 10:
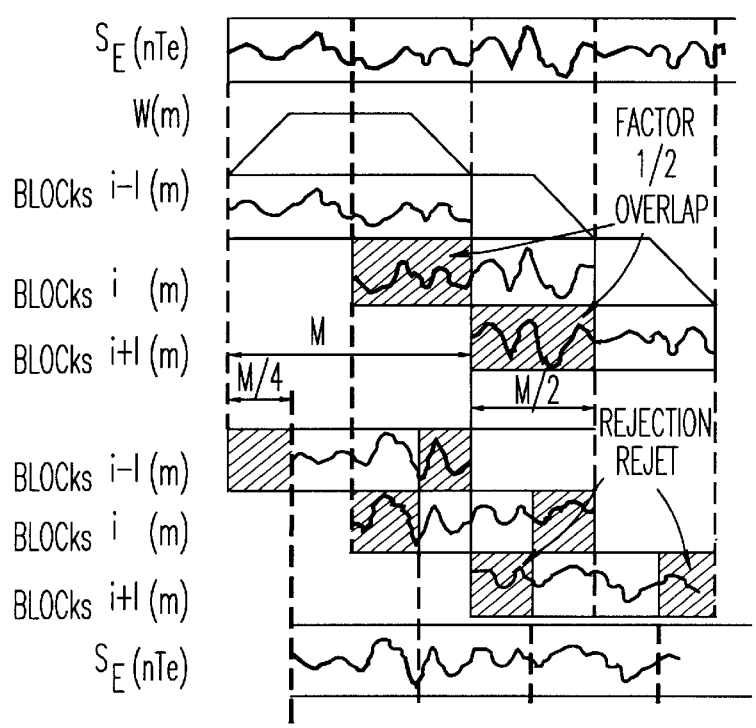
FIG. 10 illustrates the overlap and rejection procedure.

Filtering by fast convolution only functions correctly if retention only takes place of the N=M/2 central samples of the inverse fast Fourier transform, as described in document [5]. Consequently, at the input of the FDAF device, overlapping takes place of the blocks of size M of N=M/2 samples, but at the output of said device rejection takes place of the 2.M/4 samples of the ends of the block obtained, as illustrated in FIG. 10.

Thus, one has the following operations:

overlapping by a factor ½ of the blocks of size M:

$$\forall m \in [0, M-1] s_E(m) = s_{Ei} \cdot \frac{M}{2} + m$$

truncation and passage into the frequency domain:

$$S_E^i(k) = TFD[s_E^i(m) \cdot w_M(m)] =$$

$$\frac{1}{M} \sum_{m=0}^{M-1} s_E \left( i \cdot \frac{M}{2} + m \right) \cdot w_M(m) \cdot e^{-j2\pi \frac{k}{M} m}$$

multiplication by the band pass and adaptive filtering jig:

$$S_s^i(k) = S_E^i(k).GB^i(k)$$

passage into the time domain:

$$s_s^i(m) = \text{inverse } DTF[S_s^i(k)] = \sum_{k=0}^{M-1} (S_E^i(k) \cdot GB^i(k)) \cdot e^{j2\pi \frac{k}{M} m} =$$

$$\sum_{k=0}^{M-1} \left( \frac{1}{M} \sum_{m=0}^{M-1} s_E \left( i \cdot \frac{M}{2} + M \right) \cdot w_m(m) \cdot e^{-j2\pi \frac{k}{M} m} \right) \cdot$$

$$GB^i(k) \cdot e^{j2\pi \frac{k}{M} m}$$

rejection of the two ends of size M/4 of the blocks and reconstitution of the output signal:

$$\forall n \in \left[ \frac{M}{4}, \infty \right] \left[ i = int\left( \frac{2n}{M} + \frac{1}{2} \right) - 1 s_s(n) = \right.$$

$$\left. s_s^i \left( n - i \frac{M}{2} \right) \left( n - i \frac{M}{2} \right) \in \left| \frac{M}{4}, \frac{3M}{4} - 1 \right| \right]$$

Figure 11:
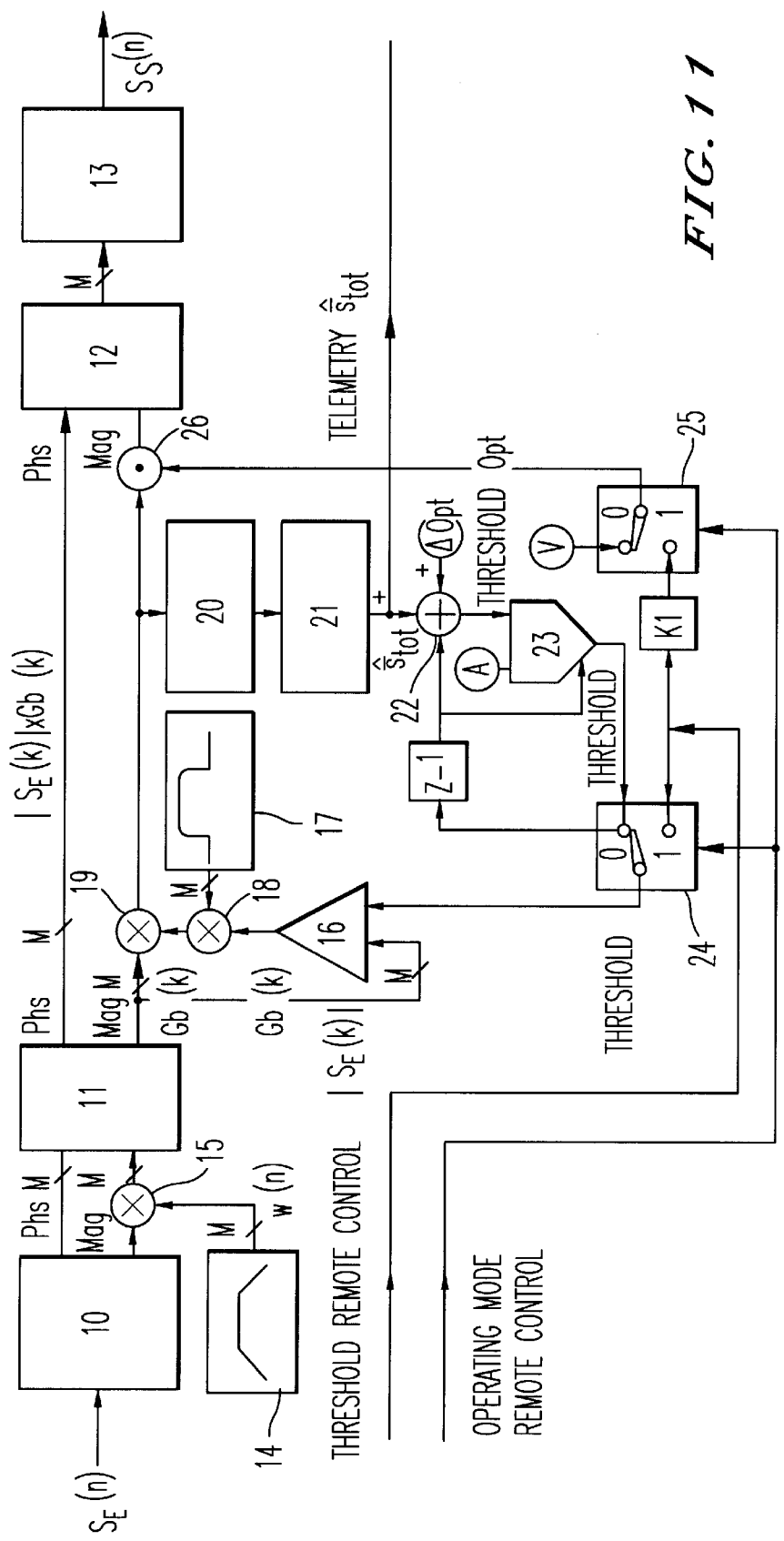
FIG. 11 illustrates the device according to the invention.

FIG. 11 illustrates a device for the quasi-optimum performance of the method according to the invention and which comprises:

a first serial-parallel conversion module 10 for blocks of size M, in which there is an overlap of the blocks by M/2 and which receives the complex input signal $s_E(n)$, a second discrete Fourier transformation module 11 using a direct, complex, fast Fourier transform, on blocks of size M, to in this way pass into the frequency domain, which receives the phase output (Phs) and amplitude output (Mag) of the first module 10, a third inverse Fourier transformation module 12 using an inverse fast Fourier transform, on blocks of size M, receiving the amplitude and phase outputs from the preceding module 11, a fourth parallel-serial conversion module 13 for blocks of size M with rejection of M/2 samples of the ends of the block obtained, which supplies the complex output signal $s_s(n)$, a fifth module 14 for generating an in this case trapezoidal, time truncation window, supplied to an input of a first vector multiplier 15 placed between the amplitude output of the first module 10 and the amplitude input of the second module 11, a comparator 16 of the module of each discrete spectral sample $S_E(k)$ for $0 \leq k \leq M-1$ with a threshold for producing a jig for locating interference signals Gb(k) and which receives the amplitude signal from the second module 11, as well as a threshold signal, a band pass FIR filter 17, whose output is supplied to a second vector multiplier 18, which also receives the output of the comparator 16 and whose output is supplied to a third vector multiplier 19 located between the amplitude output of the second module 11 and the amplitude input of the third module 12, an estimator 20 of the optimum threshold such that:

$$\hat{\tilde{S}}_{tot}^i = \frac{1}{M} \sum_{k=0}^{M-1} GB^i(k) \cdot |S_E^i(k)|$$

an averaging module 21 on P consecutive blocks such that:

$$\hat{\tilde{S}}_{tot} = \frac{1}{P} \sum_{p=0}^{P-1} \hat{\tilde{S}}_{tot}^p$$

an estimator 22 of the optimum threshold such that ŜeuilOpt= $\hat{\tilde{S}}_{tot}$+ΔOpt, a module 23 for modifying the threshold instruction such that if |Seuil − ŜeuilOpt| > A then: $\begin{cases} \text{Seuil} = \text{Seuil} - B \text{ if}(\hat{\text{Seuil}} - \text{SeuilOpt}) > 0 \\ \text{Seuil} = \text{Seuil} + B \text{ if}(\text{Seuil} - \text{SeuilOpt}) < 0 \end{cases}$ $z^{-1}$ representing in the drawing the preceding sample, a first and a second switches 24 and 25 making it possible to operate in the closed loop (mode 0) and in the open loop (mode 1), the first switch supplying the threshold signal to the comparator 16 and the second being connected to a scalar multiplier 26 between the output of the multiplier 19 and the amplitude input of the third module 12, $K_1$ being a coefficient and V a given value e.g. making it possible to obtain the variable gain G ensuring a constant output power (V=$K_1$ ×Seuil).

Adaptive rejection takes place in the frequency domain (FDAF). It uses the spectral property differences between the interference signals (narrow band) and the useful signals (broad band >> narrow band). It is based on the concatenation of two operations, frequency detection and notch filtering (FIR) of interference signals.

In the case of the STARSYS system, the originality of the invention is based on the optimization of all the settings to the characteristics of the rising return band, as well as in the two strategies proposed, constant threshold and slaving around the optimum threshold (for TEB in reception), whilst permitting a check to the on-board transmitted power, as well as a "whitening" of the spectral power density of the retransmitted signal.

By adapting parameters, this process can be applied to other frequency bands in which the same spectral difference is obtained between the interference signals and the useful signals.

I claim:

1. Device for eliminating interference signals in a direct sequence spread spectrum link, which comprises:

a first serial-parallel conversion module for blocks of size M, in which there is an overlapping of the blocks by M/2, which receives a complex input signal ($s_E(n)$), a second discrete Fourier transformation module using a direct, complex, fast Fourier transform, on blocks of size M, to thus pass into the frequency domain, which receives the phase output (Phs) and amplitude output (Mag) from the first module, a third inverse Fourier transformation module using an inverse fast Fourier transform, on blocks of size N, receiving the amplitude and phase outputs from the preceding module, a fourth parallel-serial conversion module for blocks of size M, with rejection of M/2 samples of the ends of the block obtained, which supplies a complex output signal $s_s(n)$, a fifth module for generating a time truncation window supplied to an input of a first vector multiplier, positioned between the amplitude output of the first module and the amplitude input of the second module, a comparator of the module of each discrete spectral sample with a threshold for producing a jig for the location of the interference signals (Gb(k)), which receives the amplitude signal at the output of the second module, as well as a threshold signal, a band pass, finite impulse response filter, whose output is supplied to a second vector multiplier, which also receives the output of the comparator and whose output is supplied to a third vector multiplier between the amplitude output of the second module and the amplitude input of the third module, an optimum threshold calculation module.

2. Device according to claim 1, wherein the optimum threshold calculating module comprises:

an estimator of a mean spectral density after filtering such that:

$$\hat{\bar{S}}_{tot}^i = \frac{1}{M} \sum_{k=0}^{M-1} GB^i(k) \cdot |S_E^i(k)|$$

$Gb^i(k)$ being obtained by the result of a comparison of input spectrum $|S_E^i(k)|$ with a previous threshold value, a module for averaging on P consecutive blocks such that:

$$\hat{\bar{S}}_{tot} = \frac{1}{P} \sum_{i=0}^{P-1} \hat{\bar{S}}_{tot}^i$$

an estimator of the optimum threshold such that:

$$\hat{Seuil}\ Opt = \hat{\bar{S}}_{tot} + \Delta Opt$$

a module for modifying the threshold instruction such that:
if |Seuil−Seuil Opt|>A
then: Scuil=Seuil−B if (Seuil−ScuilOpt)>0 Seuil= Seuil+B if (Seuil−ScuilOpt)>0
a mode selection module.

3. Device according to claim 2, wherein the mode selection module comprises a first and a second switches making it possible to operate in a closed loop mode (mode 0) or an open loop mode (mode 1), the first switch supplying the threshold signal to the comparator and the second being connected to a scalar multiplier located between the output of the third vector multiplier and the amplitude input of the third module.

4. Method for eliminating the interference signal(s) in a direct sequence spread spectrum link having the following stages:

frequency detection of interference signals by comparison of the composite input signal spectrum with a threshold, filtering the composite input signal with a finite impulse response filter by rapid convolution, an adaptative automatic control of the detection threshold around an optimum threshold Ŝeuil Opt in using an estimation of power spectral density in an analysis band after filtering Ŝtot and by control of one parameter Δ around an optimum value Δopt, which is the difference between the optimum threshold and a total mean spectrum $\bar{S}_{tot}$, obtained from a minimization on a mean analytic pattern or on mean losses measures, in despreading and demodulation.

5. Method according to claim 4, wherein simultaneously there is:

a minimization of mean additional losses in despreadinig/demodulation, maintaining a constant output power by compensating the influence of the detection threshold thereon, the power being, around the optimum, directly proportional to threshold, an output power spectrum, uniformly spread in frequency in the analysis band, the narrow band interfering signals being made lower than a mean output level.

6. Method according to claim 4, wherein, when the threshold is in the range {ŜeuilOpt−A, ŜeuilOpt+A}, A being the tolerance limit, the detection instruction Seuil, which is a determined constant threshold, does not change, otherwise Seuil=Seuil±B, B being the useful band, depending on whether the detection instruction Seuil is above SeuilOpt +A or below ScuilOpt−A.

7. Method according to claim 4, wherein said automatic control is used on an estimation of the input spectral density and is used either in closed loop for a positioning close to the optimum, or in open loop with a given instruction.

8. Method according to claim 7, wherein, in closed loop, a discrete automatic control is used for maintaining the detection threshold in a certain range around an optimum threshold.

9. Method according to claim 8, wherein the following stages are involved:

estimation of the mean spectral density after filtering such that:

$$\hat{S}^i_{tot} = \frac{1}{M} \sum_{k=0}^{M-1} Gb^i(k) \cdot |S^i_E(k)|$$

$Gb^i(k)$ being obtained by the result of the comparison of the input spectrum $|S^i_E(k)|$ with the previous threshold value, averaging on P consecutive blocks such that:

$$\hat{\bar{S}}_{tot} = \frac{1}{p} \sum_{i=0}^{p-1} \hat{S}^i_{tot}$$

estimation of the optimum threshold such that:

$$\hat{Seuil}\ Opt = \hat{\bar{S}}_{tot} + \Delta Opt.$$

10. Method according to claim 7, wherein, in the open loop, for carrying out a filtering of the input signal by an adaptive notch filter and for a band pass filter, there is a convolution of the signals.

11. Method according to claim 10, wherein use is made of a direct fast Fourier transform and an inverse fast Fourier transform.

12. Method according to claim 11, wherein use is made of the same direct fast Fourier transform for filtering and detection.

13. Method according to claim 12, which comprises the following stages:

overlap by a factor ½ of the blocks of size M:

$$\forall m \in \{0, M-1\}\ s_E^i(m) = s_E\left(i \cdot \frac{M}{2} + m\right)$$

truncation and passage into the frequency domain:

$$S_E^i(k) = TFD\{s_E^i(m) \cdot w_M(m)\} =$$
$$\frac{1}{M} \sum_{m=0}^{M-1} s_E\left(i \cdot \frac{M}{2} + m\right) \cdot w_M(m) \cdot e^{-j2\pi \frac{k}{M} m}$$

multiplication by the band pass and adaptative filtering jig:

$$S_s^i(k) = S_E^i(k) \cdot GB^i(k)$$

passage into the time domain:

$$s_S^i(m) = InverseTFD\{S_S^i(k)\} = \sum_{k=0}^{M-1} (S_E^i(k) \cdot GB^i(k)) \cdot e^{j2\pi \frac{k}{M} m} =$$
$$\sum_{k=0}^{M-1} \left(\frac{1}{M} \sum_{m=0}^{M-1} s_E\left(i \cdot \frac{M}{2} + m\right) \cdot w_m(m) \cdot e^{-j2\pi \frac{k}{M} m}\right) \cdot$$
$$GB^i(k) \cdot e^{j2\pi \frac{k}{M} m}$$

rejection of the two ends of size M/4 of the blocks and reconstitution of the output signal:

$$\forall n \in \left\{\frac{M}{4}, \infty\right\}\ i = int\left(\frac{2n}{M} + \frac{1}{2}\right) - 1 s_S(n) =$$
$$s_S^i\left(n - i\frac{M}{2}\right)\left(n - i\frac{M}{2}\right) \in \left\{\frac{M}{4}, \frac{3M}{4} - 1\right\}$$

14. Method according to claim 7, which is used in a nonstationary satellite system.

15. Method according to claim 14, wherein the threshold instruction applied is used for controlling a variable gain at the output, the total output power being, close to the optimum, directly proportional to the threshold.

16. Device for eliminating interference signals in a direct sequence spread spectrum link, which comprises:

a first serial-parallel conversion module for blocks of size M, in which there is an overlapping of the blocks by M/2, which receives a complex input signal ($S_E(n)$), a second discrete Fourier transformation module using a direct, complex, fast Fourier transform, on blocks of size M, to thus pass into the frequency domain, which receives the phase output (Phs) and amplitude output (Magnetic) from the first module, a third inverse Fourier transformation module using an inverse fast Fourier transform, on blocks of size M, receiving the amplitude and phase outputs from the second module, a fourth parallel-serial conversion module for blocks of size M, with rejection of M/2 samples of the ends of the block obtained, which supplies a complex output signal $S_s(n)$, a fifth module for generating a time truncation window supplied to an input of a first vector multiplier, positioned between the amplitude output of the first module and the amplitude input of the second module, a comparator of the module of each discrete spectral sample with a threshold for producing a jig for the location of the interference signals (Gb(k)), which receives the amplitude signal at the output of the second module as well as a threshold signal, a band pass, finite impulse response filter, whose output is supplied to a second vector multiplier, which also receives the output of the comparator and whose output is supplied to a third vector multiplier between the amplitude output of the second module and the amplitude input of the third module, an estimator of the optimum threshold such that:

$$\hat{S}^i_{tot} = \frac{1}{M} \sum_{k=0}^{M-1} GB^i(k) \cdot |S_E^i(k)|$$

a module for averaging on P consecutive blocks such that:

$$\hat{\bar{S}}_{tot} = \frac{1}{p} \sum_{p=0}^{p-1} \hat{S}_{tot}$$

an estimator of the optimum threshold such that:

$$\hat{Seuil}\ Opt = \hat{\bar{S}}_{tot} + \Delta Opt.$$

17. Device according to claim 16, wherein a mode selection module makes following operating possible:

either in closed loop (mode 0) with another module for modifying the threshold instruction such that:

$$\text{if } |\text{Seuil} - \hat{\text{SeuilOpt}}| > A$$

$$\text{then: } \begin{cases} \text{Seuil} = \text{Seuil} - B \text{ if}(\text{Seuil} - \hat{\text{SeuilOpt}}) > 0 \\ \text{Seuil} = \text{Seuil} + B \text{ if}(\text{Seuil} - \hat{\text{SeuilOpt}}) < 0 \end{cases}$$

either in open loop (mode 1), said mode selection module comprises a first and a second switches, the first switch supplying the threshold signal to the comparator and the second being connected to a scalar multiplier located between the output of the third vector multiplier and the amplitude input of the third module.

* * * * *